United States Patent [19]

DeSimone et al.

[11] Patent Number: 5,312,882

[45] Date of Patent: May 17, 1994

[54] HETEROGENEOUS POLYMERIZATION IN CARBON DIOXIDE

[75] Inventors: Joseph M. DeSimone; Elise E. Maury, both of Chapel Hill; James R. Combes, Carboro; Yusuf Z. Menceloglu, Chapel Hill, all of N.C.

[73] Assignee: The University of North Carolina at Chapel Hill, Chapel Hill, N.C.

[21] Appl. No.: 99,905

[22] Filed: Jul. 30, 1993

[51] Int. Cl.$^5$ .............................................. C08F 2/00
[52] U.S. Cl. .................................. 526/201; 526/194; 526/346
[58] Field of Search .................. 526/201, 194, 346

[56] References Cited

U.S. PATENT DOCUMENTS 3,522,228  7/1970  Fukui et al. .
4,748,220  5/1988  Hartmann et al. .
4,933,404  6/1990  Beckmann et al. .

FOREIGN PATENT DOCUMENTS 0301532  2/1989  European Pat. Off. .

OTHER PUBLICATIONS

DeSimone et al.; *Synthesis of Fluoropolymers in Supercritical Carbon Dioxide;* Science 257; 945-947; (1992).

*Primary Examiner*—Joseph L. Schofer
*Assistant Examiner*—N. Sarofim
*Attorney, Agent, or Firm*—Bell, Seltzer, Park & Gibson

[57] ABSTRACT

The heterogeneous polymerization of water-soluble polymer in $CO_2$ is disclosed. The method comprises providing a heterogeneous reaction mixture comprising $CO_2$, a monomer, and a surfactant, then polymerizing the monomer to form a water-soluble polymer.

10 Claims, 2 Drawing Sheets $^1$H NMR SPECTRUM OF SAMPLE I TRIBLOCK COPOLYMER

HETEROGENEOUS POLYMERIZATION IN CARBON DIOXIDE

FIELD OF THE INVENTION

This invention relates generally to the polymerization of hydrophobic monomers, and more specifically relates to the heterogeneous polymerization of hydrophobic monomers in a carbon dioxide continuous phase.

BACKGROUND OF THE INVENTION

Emulsion polymerization is a heterogeneous process often used by industry to polymerize a wide variety of monomers using free radical mechanisms. It involves the polymerization of monomers in the form of emulsions or latexes. Polymers commonly formed by emulsion include acrylics, styrenics, polyvinylchloride (PVC), styrene-butadiene rubber, ethylene-propylenediene terpolymer-based (EPDM), polystyrene, acrylonitrile- butadiene-styrene copolymer (ABS), neoprene rubber, ethyl-vinyl acetate, styrene-maleic anhydride, tetrafluroethylene, and vinyl fluoride.

Generally, low molar mass ionic surfactants have enjoyed the most use in water-based emulsion polymerizations because they work so efficiently to stabilize the ionic double layer of the emulsion or colloid particles which prevents particle coagulation. In addition, polymeric surfactants have also been utilized to stabilize emulsion polymerizations. See Piirma, *Polymeric Surfactants* in 42 *Surfactant Science Series* (Marcel Dekker, New York 1992). This class of surfactants stabilizes colloidal particles by steric, rather than ionic, means. Steric stabilization of emulsions can be advantageous in that (a) steric systems are much less sensitive to fluctuations and increases in electrolyte concentrations, (b) they work well at high and low solids contents, and (c) they stabilize aqueous and nonaqueous dispersions equally well. See Napper, *Polymeric Stablization of Colloidal Dispersions* (Academic Press, New York 1983). Many nonionic polymeric surfactants are available; the most common of these are basically block copolymers of poly(ethylene oxide) (PEO) and poly(propylene oxide) (PPO).

After polymerization, the polymer must be coagulated and isolated from the aqueous phase for further processing (except for that which is destined for use in water-borne coatings). The large volume of water remaining comprising the continuous phase must be properly handled, as it becomes contaminated with organic compounds residual monomers, stabilizers, and other materials that are difficult to remove. As a result, it would be desirable to provide a different medium for the continuous phase that can be easily decontaminated.

In view of the foregoing, it is a first object of the present invention to provide a heterogeneous polymerization method in which a fluid other than water comprises the continuous phase medium.

It is also an object of the present invention to provide surfactants useful for the foregoing methods.

It is a further object of the present invention to provide initiators suitable for use with the foregoing methods.

SUMMARY OF THE INVENTION

These and other objects are satisfied by the present invention, which includes as a first aspect a method of carrying out the heterogenous polymerization of monomers that form a water-insoluble polymer. The method comprises providing a heterogeneous reaction mixture comprising carbon dioxide, a monomer, and a surfactant and polymerizing the monomer in the reaction mixture. The method is suitable for both suspension and emulsion polymerizations.

The present invention includes as a second aspect a heterogeneous reaction mixture useful for carrying out the heterogenous polymerization of a monomer that forms a water-insoluble polymer. The reaction mixture comprises a carbon dioxide, the monomer, and a surfactant.

A third aspect of the present invention is a surfactant useful for carrying out the heterogenous polymerization of a hydrophobic monomer. The surfactant comprises a first hydrophobic group covalently joined to a second carbon-dioxide soluble group, wherein the carbon-dioxide soluble group comprises a fluorinated siliconated component.

A fourth aspect of the present invention is a polymerization initiator suitable for use in a heterogeneous polymerization carried out with a carbon dioxide continuous phase. The initiator comprises a first carbon dioxide-soluble group comprising a fluoropolymer covalently joined to a second free-radical forming group.

The use of $CO_2$ as the continuous phase medium rather than water is advantageous for a number of reasons. First, because water has been replaced as the continuous phase medium, there is no longer a concern about contaminating (and thus having to purify) the continuous phase water. Second, the polymer can be easily isolated from the continuous phase, as the $CO_2$ can simply be vented from the reaction vessel. Third, the density and hence the viscosity of $CO_2$ can be tuned over a large range of conditions due to its compressibility, particularly in the supercritical phase, and thus particle size and morphology of the polymer can be controlled.

Carbon dioxide ($CO_2$) has been employed as a polymerization medium. For example, European Patent Application No. 88112198.2, filed Jul. 29, 1988, discloses the polymerization of acrylic acid monomer, a comonomer, $CO_2$, and an initiator. The $CO_2$ can be used in a supercritical fluid phase. The resulting copolymer is useful as a thickening agent. In addition, Hartmann et al., U.S. Pat. No. 4,748,220, disclose a polymerization of monoethylenically unsaturated carboxylic acids, their amides and esters, and aminoalcohols in supercritical $CO_2$. However, neither of these references disclose a heterogenous polymerization reaction in which $CO_2$ is the continuous phase medium and in which a surfactant is included to induce micelle formation, nor is a surfactant suitable for use in such a polymerization disclosed. Recently, Consani et al., *J. Supercrit. Fl.* 3:51 (1990), reported a screening of the solubility of different surfactants in $CO_2$. Also, it has been shown that a large variety of fluoropolymers and fluorinated copolymers are very soluble in $CO_2$. See DeSimone et al., *Science* 257:945 (1992). None of this suggests the use of $CO_2$ as a continuous phase in a heterogenous polymerization.

DETAILED DESCRIPTION OF THE INVENTION

The present invention is directed to a method of carrying out the heterogeneous polymerization of a hydrophobic monomer. The steps of the method comprise providing a reaction mixture comprising a carbon dioxide ($CO_2$) continuous phase, and a hydrophobic dispersed phase comprising a surfactant and a hydrophobic monomer dissolved therein, then polymerizing the monomer in the reaction mixture.

As used herein, a "heterogeneous reaction" is one in which the polymerization is carried out through the use of media that create at least two separate phases. One phase is termed the "continuous phase", which comprises a fluid, and the other is termed the "dispersed phase", comprising the monomer or monomers to be polymerized. The monomer is stabilized in the dispersed phase by a surfactant (also known as an emulsifier, or a stabilizer) that reduces the surface tension between the phases. The term "heterogeneous reaction" is intended to encompass both suspension polymerizations, in which any polymerization initiator is preferentially solubilized in the dispersed phase, and emulsion reactions, in which any polymerization initiator is preferentially solubilized in the continuous phase. As used herein, a compound is "preferentially solubilized" in one phase over another when it is more soluble in that phase.

The present invention is preferably carried out by emulsion polymerization. The generally accepted view of emulsion polymerization is described in Harkins, *J. Amer. Chem. Soc.* 69:1428 (1947), and further developed in Smith and Ewart, *J. Chem. Phys.* 16:592 (1948). A classical oil-in-water (O/W) emulsion polymerization generally includes as reagents water, a water-insoluble monomer, a water-soluble initiator, and an emulsifier. As the monomer is insoluble in the continuous phase (water), it is dispersed as droplets, which are stabilized by the surface active emulsifier, and is also solubilized in micelles formed by the emulsifier. The initiator is soluble in the continuous water phase. Upon its decomposition to form radicals, the initiator initiates the polymerization of the trace amount of monomer dissolved in the water-rich phase. As the molecular weight of the macromolecule increases, it eventually becomes insoluble in water, at which time it precipitates to form a primary particle. These primary particles can coalesce to form larger particles which become stabilized by the surface active emulsifier present in the system.

The overall rate of polymer propagation, $R_p$, typically follows the so-called Smith-Ewart kinetics described by the following equation:

$$R_p = k_p N <n> [M] \quad \text{(I)}$$

where $k_p$ is the rate constant for propagation, N is the number of particles that form, $<n>$ is the average number of radicals per particle, and [M] is the monomer concentration in the particles. The number average degree of polymerization, $<Xn>$, can also be quantified as:

$$<Xn> = k_p N [M] R_j^{-1} \quad \text{(II)}$$

where $R_j$ is the rate of initiation. It is clear that both the rate of propagation and the overall molar mass of the resulting polymer are both dependant on the number of polymer particles, N. According to Smith-Ewart theory, the number of particles is given by:

$$N \propto [S]^{3/5} \quad \text{(III)}$$

where [S] is the total surfactant or emulsifier concentration. This simultaneous dependence of the rate of polymerization and the molar mass of the polymer on the surfactant concentration illustrates the utility of emulsion polymerization processes, as a reaction can simultaneously provide high rates of polymer production and high molar masses; this result differs markedly from solution polymerizations that transpire in a single phase.

The $CO_2$ can be employed in a liquid, vapor, or supercritical phase. If liquid $CO_2$ is used, the temperature of the reaction should be below 31° C. Preferably, the $CO_2$ in the continuous phase is in a "supercritical" phase. As used herein, "supercritical" means that a fluid medium is at a temperature that is sufficiently high that it cannot be liquified by pressure. The thermodynamic properties of $CO_2$ are reported in Hyatt, *J. Org. Chem.* 49:5097–5101 (1984); therein, it is stated that the critical temperature of $CO_2$ is about 31° C.; thus the method of the present invention should be carried out at a temperature above 31° C. The reaction temperature should be chosen to provide sufficient heat energy to initiate and propagate the polymerization. Preferably, the reaction temperature will be between 50° C. and 200° C., and more preferably will be between 50° C. and 100° C.

The advantage of conducting the polymerization with supercritical $CO_2$ inures from the tendency of the solvent strength of a solvent in a supercritical phase to be easily manipulated by varying the pressure of the fluid. As a result of this phenomenon, the use of supercritical $CO_2$ permits one carrying out the polymerization to significantly influence the particle size, distribution, and other aspects of the final product without varying either the solvent temperature or composition (i.e., including a co-solvent).

The method of the present invention includes a dispersed phase comprising a monomer stabilized by a surfactant. The surfactant provided to the reaction mixture should be one that is surface active in $CO_2$ and thus partitions itself at the $CO_2$-monomer/polymer interface. Such a surfactant should cause the formation of micelles in the $CO_2$ and thus create a dispersed phase that permits the polymerization to follow the Smith-Ewart kinetics described above. The surfactant is generally present in the reaction mixture in a concentration of between 0.01 and 30 percent by weight. The surfactants can be nonreactive in the polymerization or can react with an thereby be included with the forming polymer. See, e.g., U.S. Pat. Nos. 4,592,933 and 4,429,666 for exemplary reactive surfactants.

The surfactant should contain a segment that is soluble in $CO_2$ ("$CO_2$-philic"). Exemplary $CO_2$-philic segments include a fluorine-containing segment or a siloxane-containing segment. As used herein, a "fluoropolymer" has its conventional meaning in the art. See generally *Fluoropolymers* (L. Wall, Ed. (1972)(Wiley-Interscience Division of John Wiley & Sons); see also *Fluorine-Containing Polymers*, 7 Encyclopedia of Polymer Science and Engineering 256 (H. Mark et al. Eds., 2d Ed. 1985). Exemplary fluropolymers are those formed from: fluoroacrylate monomers such as 2-(N-ethylperfluorooctanesulfonamido) ethyl acrylate ("EtFOSEA"), 2-(N-ethylperflooctanesulfonamido) ethyl methacrylate ("EtFOSEMA"), 2-(N-methylper- fluorooctanesulfonamido) ethyl acrylate ("MeFO-SEA"), 2-(N-methylperflooctanesulfonamido) ethyl methacrylate ("MeFOSEMA"), 1,1-Dihydroperfluorooctyl acrylate ("FOA"), and 1,1-Dihydroperfluorooctyl acrylate ("FOMA"); fluoroolefin monomers such as tetrafluoroethylene, fluorostyrene monomers such as α-fluorostyrene, β-fluorostyrene, α, β-difluorostyrenes, β,β-difluorostyrenes, α,β,β-trifluorostyrenes, α-trifluoromethylstyrenes, 2,4,6-Tris(-trifluoromethyl)styrene, 2,3,4,5,6-pentafluorostyrene, 2,3,4,5,6-pentafluoro-α-methylstyrene, and 2,3,4,5,6-pentafluoro-β-methylstyrene; fluoroalkylene oxide monomers such as perfluoropropylene oxide and perfluorocyclohexene oxide; fluorinated vinyl alkyl ether monomers; and the copolymers thereof with suitable comonomers, wherein the comonomers are fluorinated or unfluorinated. Exemplary siloxane-containing compounds include alkyl, fluoroalkyl, and chloroalkyl siloxanes.

More preferably, the surfactant comprises a hydrophobic group, such as a polystyrene group, that is "$CO_2$-phobic," along with a $CO_2$-soluble group, such as a fluoropolymer. Such copolymers can take many forms; two exemplary forms are graft copolymers having a $CO_2$-soluble backbone and hydrophobic branches attached thereto and triblock copolymers having a central hydrophobic portion attached at opposite ends to one of a pair of $CO_2$-soluble portions are preferred. Triblock copolymers often exhibit markedly different properties than their individuals constituents, as the individual segments of the copolymers tend to phase separate; the chemical bond between the segments prevents macroscopic phase separation, so microdomains tend to form. When a triblock copolymer as described above is dissolved in $CO_2$, the $CO_2$-soluble end portions extend into the $CO_2$ continuous phase, but the hydrophobic portions can aggregate to form the core of a micelle. It is particularly preferred that the fluoropolymer segment be a perfluoropolymer such as,dihydroperfluorooctyl acrylate. A preferred triblock copolymer surfactant comprises poly(1,1-dihydroperfluorooctyl acrylate) end blocks and a polystyrene center block.

Other suitable surfactants that are surface active in carbon dioxide to stabilize the dispersed phase include

(IV)

(V)

(VI)

(VII)

(VIII)

(IX)

(X)

where x=1-30 and y=1 to 30. The x and y values are chosen to adjust the balance between "$CO_2$-philic" and "$CO_2$-phobic" to tailor. The surface activity of the reagents. Exemplary silicone-containing surfactants include (XI)

(XII)

wherein x and y are varied to adjust to "$CO_2$-philic" and "$CO_2$-phobic" balance.

Suitable monomers for use with this invention are those that form water-insoluble polymers. Exemplary monomers forming such polymers include vinyl monomers such as vinyl chloride and vinyl acetate, ethylene, acrylonitrile, dienes such as isoprene and butadiene, styrenics such as styrene and t-butyl styrene, chloroprene, acrylic monomers such as alkylmethyl acrylates, fluromonomers as given above, and maleic anhydride. Particularly suitable hydrophobic monomers can be selected from the group consisting of styrene monomers, acrylic monomers, vinyl chloride monomers, olefinic monomers, fluoroolefinic monomers, fluoroacrylate monomers, fluorostyrenic monomers, and maleic anhydride monomers The method is suitable for polymerizations of a single monomer or copolymerizations of more than one hydrophobic monomer, and can also be end to copolymers hydophobic and hydrophilic monomers. In addition, monomers that provide cross-linking and branching, such as divinyl benzene and di-triacrylates, can also be included. The monomer can be included in the reaction mixture proportions ranging from 1 to 70 percent by weight.

The heterogeneous reaction can optionally include a free radical initiator that accelerates the polymerization. The initiator is chosen based on its solubility characteristics: it should preferentially solubilize in the dispersed phase for a suspension reaction, or in the $CO_2$ continuous phase for an emulsion reaction. The initiator is included in the solution in a concentration ranging from 0.001 to 20 percent by weight.

Those skilled in this art will be familiar with a number of initiators that can solubilize in hydrophobic media. Organic free radical initiators are preferred and include, but are not limited to, the following: acetylcyclohexanesulfonyl peroxide; diacetyl peroxydicarbonate; dicyclohexyl peroxydicarbonate; di-2-ethylhexyl peroxydicarbonate; tert-butyl perneodecanoate; 2,2'-azobis (methoxy-2,4-dimethylvaleronitrile; tert-butyl perpivalate;

dioctanoyl peroxide; dilauroyl peroxide; 2,2'-azobis (2,4-dimethylvaleronitrile); tert-butylazo-2-cyanobutane; dibenzoyl peroxide; tert-butyl per-2-ethylhexanoate; tert-butyl permaleate; 2,2-azobis (isobutyronitrile); bis(tert-butylperoxy) cyclohexane; tert-butyl peroxyisopropylcarbonate; tert-butyl peracetate; 2,2-bis (tert-butylperoxy) butane; dicumyl peroxide; ditert-amyl peroxide; di-tert-butyl peroxide; p-methane hydroperoxide; pinane hydroperoxide; cumene hydroperoxide; and tert-butyl hydroperoxide. Preferably, the initiator is azobisisobutyronitrile ("AIBN").

Initiators that preferentially solubilize in $CO_2$ include a $CO_2$-philic segment (typically a fluorinated or siloxane segment) and a free radical-producing segment; thus the attachment of a fluorinated or siloxane segment to the free radical initiators listed above produces initiators that can be used with the present invention. A particularly preferred $CO_2$-soluble initiator is that of Formula XIII:

The polymerizing step of the present invention can be carried out by polymerization methods using apparatus and conditions known to those skilled in this art. Typically, the reaction begins by heating the reaction vessel to a temperature above 31° C. (generally between 50° C. and 200° C). The initiator, monomer or monomers, surfactant, and $CO_2$, are added to the vessel. Typically the mixture is allowed to polymerize for between about 2 and 24 hours, and preferably is stirred as the reaction proceeds. At the conclusion of the reaction, the polymer can be collected by methods such as venting of the $CO_2$ or by fractionation. Preferably, the surfactant is fractionated from the $CO_2$ and polymer by reducing temperature and pressure and thus is able to be reused. After separation, the polymer can be collected by conventional means. In addition, the polymers of the present invention may be retained in the $CO_2$, dissolved in a separate solvent, and sprayed onto a surface. After the $CO_2$ and solvent evaporate, the polymer forms a coating on the surface.

The polymer formed by the present invention can also be used to form molded articles, such as valves and bottles, films, fibers, resins, and matrices for composite materials.

The present invention is explained in greater detail in the following examples. As used herein, "M" means molar concentration, "NMR" means nuclear magnetic resonance, "MHz" means megahertz, "GPC" mean gas phase chromatography, "Å" means angstroms, "UV" means ultraviolet, "g" means grams, "mol" means moles, "mL" means milliliters, "°C" means degrees Celsius, "S" means seconds, "h" means hours, "psig" means pounds per square inch (gauge), "$M_n$" means number merger molecular weight, "MWD" means molecular weight distribution, "f" means functionality, "ppm" means parts per million, "$T_g$" means glass transition temperature, "nm" means nanometers, "mg" means milligrams, "rpm" means revolution per minute, and "psi" means pounds per square inch. These Examples are illustrative and are not to be taken as limiting of the invention.

EXAMPLE 1

Reagents and materials

The preparation of the reagents and materials used in the subsequent examples is set forth hereinbelow. 4,4'-Azobis-4-cyanopentanoic acid, potassium t -butoxide (1M in THF), and a,a,a-trifluorotoluene (99+% pure) (Aldrich), sodium bicarbonate and sodium sulfate (Fisher Scientific), acetone (EM Science, GR grade), methanol and hexanes (Mallinckrodt, Inc., HPLC grade), 1,1,2-Trifluorotrichloroethane (3M) (Freon-113), sec-Butyllithium (1.4 M in cyclohexane - provided courtesy of Lithium Corporation), chlorosilane perfluorohexylethyl-dimethyl silylchloride (Petranch), and perfluorinated alcohol (DuPont) were used as received. Pyridine (EM Science) was purified by vacuum distillation. Tetrahydrofuran (Fisher Certified Grade) (THF) was refluxed over sodium and distilled under an argon atmosphere. Acryloyl chloride (Aldrich) was purified by vacuum distillation. Azobisisobutyro-nitrile (Kodak) (AIBN) was recrystallized from methanol. 1,1-Dihydroperfluorooctyl acrylate (3M) (FOA) was passed through columns of decolorizing carbon and alumina. Cyclohexane (Phillips Petroleum Company) was stirred over concentrated sulfuric acid for approximately two weeks, decanted and distilled from a sodium dispersion under argon. Styrene (Fisher) was vacuum distilled from dibutyl magnesium following three freeze-thaw cycles. p-Vinylbenzyl chloride (Kodak) was passed through an alumina column under argon atmosphere. p-Vinylbenzyl iodide was synthesized from p-vinylbenzyl chloride using the Finkelstein reaction. Carbon dioxide (Matheson, 99.5%) was purified by passing through columns of molecular sieves and reduced copper oxide catalyst (BASF R3-11). Tetraethylthiuram disulfide (TD, Aldrich) was recrystallized twice from methanol and the purity was checked by $^1H$ NMR. Toluene (Fisher, Certified Grade) was distilled under argon over sodium metal. 1,1-Dihydroperfluorooctyl methacrylate (3M) (FOMA) and 2-ethylhexyl acrylate (Aldrich) and styrene (Aldrich) were passed through a column of alumina prior to use. All glassware was rigorously cleaned and flame-dried prior to use.

EXAMPLE 2

Characterization of Polymers

$^1H$ NMR spectra were recorded on a Bruker AMX300 NMR spectrometer or on a Bruker AC-200 at 200 MHz in $CDCl_3$ or Freon-113/$CDCl_3$. UV spectra were obtained on a Perkin Elmer Lambda 6 UV/vis spectrometer interfaced to an IBM PS/2 model 50 computer. Differential scanning calorimetry analyses were performed on a Perkin Elmer DSC-7. The molecular data of the telechelic polystyrenes were obtained by running GPC on a Waters 150-CV gel permeation chromatograph with Ultrastyragel columns of 100, 500, $10^3$, $10^4$, and $10^5$Å porosities using THF as eluent. Polystyrene standards (Showa Denko) were used to determine the molecular mass and molecular weight distribution. Macromolecular end groups were analyzed by $^1H$ NMR, UV analyses, and by GPC analyses on another Waters GPC instrument with a Waters 996 photodiode array detector which measures the UV spectrum of each elution of the polymer.

EXAMPLE 4

Fluoro-azo Initiator Synthesis 4,4'-Azobis-4-cyanopentanoyl chloride was prepared from the acid analog by the method described in Smith, *Makromol. Chem.* 103:301 (1967). 0.022 mol (7.124 g) of 4,4'-azobis-4-cyanopentanoyl chloride in 160 mL of dry THF was added drop-wise to a solution of 0.039 mol (20.302 g) of perfluorinated alcohol and a catalytic amount of pyridine in 60 ml of Freon 113 at room temperature and stirred for 3 hours under inert atmosphere. After the filtering of pyridine hydrochloride, the solution was concentrated and washed with a $NaHCO_3$ solution and water to remove unreacted 4,4'-azobis-4-cyanopentanoic acid and pyridine. The organic layer was dried over $Na_2SO_4$ and solvent was evaporated under reduced pressure to produce a 70 percent yield of a compound of Formula XIII:

(XIII)

EXAMPLE 4

Fluoro-Azo Initiator Solubility

The initiator used in an emulsion polymerization should be preferentially soluble in $CO_2$ and partition itself into the continuous $CO_2$ phase over the hydrophobic dispersed phase in order to benefit from Smith-Ewart kinetics. The fluorinated azo-initiator synthesized in Example 3 meets this solubility criterion. This molecule is very soluble in $CO_2$ and decomposes in an analogous fashion to AIBN. The initiator decomposes with a first order rate constant of $k_d = 15.64 \times 10^{-6} s^{-1}$ which indicates that it has a 12.3 h half life at 70° C. The highly fluorinated nature of this molecule imparts the desirable solubility/insolubility profile; it is insoluble in most organic solvents (benzene, toluene, cyclohexane, acetonitrile, carbontetrachloride, dimethylformamide, dimethylacetamide); insoluble in many hydrophobic monomers (styrene, t-butyl styrene, acrylic acid); insoluble in water; and soluble in Freon-113 and $CO_2$.

EXAMPLE 5

Polystyrene Macromonomer Synthesis

A. Anionic Polymerization: The anionic polymerization of styrene was conducted in a one-neck 500 mL round-bottomed flask equipped with a magnetic stir bar and rubber septum under a 5–8 psig argon atmosphere. The polymerization was initiated with sec-butyllithium and stirred overnight at room temperature. The polymerization was functionally terminated by the addition of a two-fold excess of ethylene oxide followed by the addition of vinylbenzyl iodide. The polymer was precipitated in a ten-fold excess of methanol, dissolved in THF to remove unreacted vinylbenzyl iodide and reprecipitated in methanol. The polymer was then dried in vacuo overnight and stored at −8° C.

B. Free Radical Polymerization of Telechelic Polystyrene: Telechelic dithiocarbamate functionalized polystyrenes of different molecular weight were prepared by the so-called "iniferter" technique using TD as the iniferter. See Ostu et al., *Makromol. Chem Rapid Commun.* 3:127 (1982). Previous studies have shown that TD not only serves as a free radical initiator, but also has high reactivity for chain transfer to initiator and primary radical termination. Id. These features ensure that the polymer will be end-capped with two initiator fragments.

After polymerization, the polymer was recovered by precipitation of the polymerization solution into a large excess of methanol and drying. The resulting polymer was purified twice by dissolution in THF and reprecipitation into methanol.

The telechelic polystyrene produced by this method was then characterized (see Table 1). The molecular weight of the polymer was determined by GPC. The presence of the residual initiator and the functionality of the end groups were determined by $^1H$ NMR and by UV analyses as described previously. See Turner et al., *Macromolecules* 23:1856–1859 (1990).

TABLE 1

| Synthesis of Telechelic Polystyrenes | | | |
|---|---|---|---|
| Sample ID | $M_n$ (GPC) | MWD | $f(\%)$ |
| 1 | 3.3K | 1.5 | 1.9 |
| 2 | 5.6K | 1.8 | 1.8 |
| 3 | 8.8K | 2.1 | 2.0 |

The telechelic polystyrenes were also analyzed by a Waters GPC with a photodiode array detector which can give an elution time-peak intensity-UV absorption spectra 3-dimensional plot. The functionality can also be calculated from the 3-D GPC plot.

EXAMPLE 6

Synthesis of Graft Polymer Surfactant by Copolymerization of Polystyrene Macromonomer and FOA A calculated amount of PS macromonomer as synthesized in Example 5.A, FOA and AIBN were added to a round bottom flask and deoxygenated. The synthesis is depicted in Scheme 1 below.

Scheme 1: Synthesis of $CO_2$-soluble surfactants

A mixture of Freon-113 and THF were added under argon and the flask was placed in a water bath at 60° C. for approximately 48 h. The PFOA-g-PS copolymer was precipitated in methanol, extracted several times with cyclohexane, and dried to constant weight at ambient temperature in vacuo.

The copolymer produced by this method is a graft copolymer having a "$CO_2$-philic" PFOA backbone with hydrophobic PS branches. After extraction to remove any unincorporated macromonomer, the poly(-FOA-g-PS) copolymer is soluble in $CO_2$ at 3500 psi, 60° C. (10 wt %).

EXAMPLE 7

Synthesis of FOA-Styrene-FOA Triblock Copolymer Surfactants 1 g of telechelic polystyrene ($M_n = 5590$, MWD = 1.8) as synthesized in Example 5.B was used as the photoinitiator of FOA monomer (5 g) in a,a,a-trifluorotoluene solution (20 mL). Three different samples were prepared by Scheme 2 below.

FOA composition. The synthesis data are summarized in Table 2:

TABLE 2

Synthesis of ABA Triblock Copolymers*

| | TD-PSt | | | FOA | block copolymer | | |
|---|---|---|---|---|---|---|---|
| run | $M_n$ | f | wt (g) | (g) | wt (g) | yield (%) | $M_n (\times 10^4)$** |
| 1 | 5.6K | 1.8 | 1.0 | 5.0 | 4.88 | 81 | 2.87 |
| 2 | 5.6K | 1.8 | 0.5 | 5.0 | 4.89 | 89 | 7.73 |
| 3 | 3.3K | 1.9 | 0.2 | 5.0 | 4.43 | 85 | 4.95 |

*Polymerization run overnight in tribluorotoluene/freon-113 (5/1) mixed solvent with a 140 W UV lamp as irradiation source.
**Determined from $^1$H NMR and the $M_n$ of the prepolymer.

Figure 1:
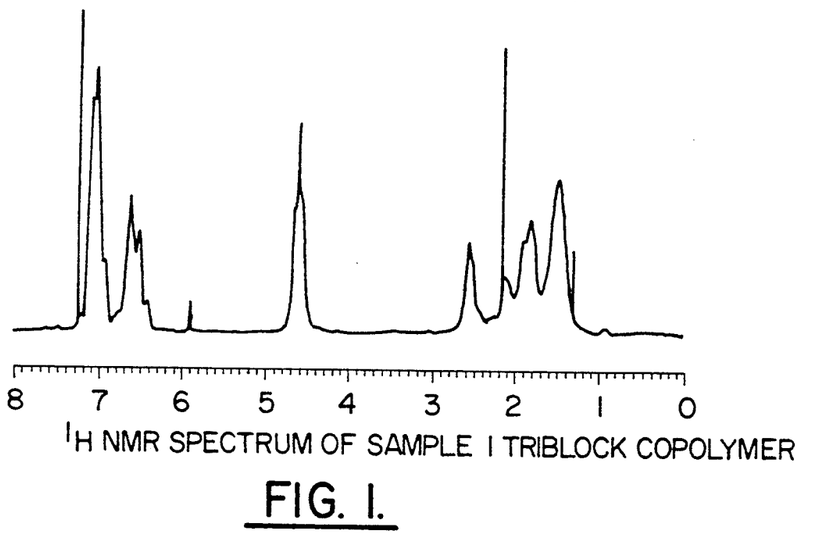
FIG. 1 is a plot showing the $^1H$ NMR spectra for an FOA-styrene-FOA triblock copolymer.

The purified triblock polymers were characterized with $^1$H NMR and DSC. $^1$H NMR spectra (FIG. 1) show the resonances of both styrene and FOA repeating units. The peak at 4.61 ppm is due to the methylene of the ester group of FOA and the aromatic resonances (6.3–7.3 ppm) are due to the phenyl ring of styrene. From the ratio of the area of the two peaks the chemical composition and the molecular mass was calculated (Table 2).

Scheme 2
Photo-Block Copolymerization of TD-PSt with FOA

In Sample 1, m = 25.5, n = 51; in Sample 2, m = 79, n = 51; in Sample 3, m = 50.9, n = 28.7. Upon UV irradiation of the functionalized polystyrene (Hanovia, 140W), the chain ends dissociate to generate polymeric radicals which in turn initiate the polymerization of FOA. The dithiocarbamate radical is less reactive and is not effective in initiating the polymerization of acrylate monomers. After 48 h UV irradiation, the polymerization solution was precipitated into methanol to give 4.88 g of polymer (81.3% yield).

EXAMPLE 8

Characterization of FOA-Styrene-FOA Triblock Copolymer

The block copolymers prepared in Example 7 were purified by Soxhelet extraction with cyclohexane to remove any unreacted prepolymer. The copolymer of sample 1, with the short FOA block, is soluble in THF, $CHCl_3$ and hot cyclohexane. About 5 wt % of the polymer product is soluble in cyclohexane at room temperature which was found to be by $^1$H NMR to be mainly unreacted polystyrene. Samples 2 and 3, with longer FOA blocks. were Soxhlet extracted with hot cyclohexane extract determined by $^1$H NMR, the hot cyclohexane extract removed not only the unreacted polystyrene, but also some block copolymer that was low in The DSC trace of Sample 1 shows two glass transition temperatures which indicates microphast separation in the bulk. $T_g^1 = -10°$ C. corresponds to the glass transition of FOA microdomains and $T_g^2 = 97°$ C. corresponds to the glass transition of the styrene microdomains.

As shown in Table 3, the solubility of the block copolymers are quite different from the homopolymers. The FOA homopolymer is soluble in Freon-113 and $CO_2$ but insoluble in common organiz solvents. However, the sample 1 block copolymer is soluble in THF, $CHCl_3$, etc. As the fluorinated block becomes longer (sample 2) or the center block become shorter (sample 3), the copolymer is insoluble in THF or $CHCl_3$, but is soluble in Freon-113 and $CO_2$.

TABLE 3

Solubility of Triblock Copolymer in Different Solvents

| | | | Solubility | | | |
|---|---|---|---|---|---|---|
| Sample | n | m | THF | $CHCl_3$ | Freon | $CO_2$ |
| 1 | 51 | 25.5 | + | + | + | − |
| 2 | 51 | 79 | − | − | + | + |
| 3 | 28.7 | 50.9 | − | ± | + | + |

"+" = soluble; "−" insoluble.

EXAMPLE 9

Synthesis of FOMA-2-Ethylhexyl Acrylate-FOMA Triblock Copolymer Surfactant

A 450 mL Autoclave Engineers o-ring closure, stirred autoclave with a modular furnace and process controller was used as the high pressure polymerization reactor. Pressure was measured with Sensotec Model TJE pressure transducer. Three rupture disks with a burst pressure of 690 bar are present in the system and all of the components were connected to argon to maintain an inert atmosphere at all times.

The reactor was heated to 60° C. and purged with argon for 1-2 hours. 1.35 g (1 mol % to monomer) of AIBN dissolved in a minimal amount of THF were injected into the reactor. Following the rapid evaporation of THF, 99.5 g of FOMA (50 mol %) and 35.5 g of 2-Ethylhexyl acrylate (50 mol %) were introduced under argon atmosphere. The reactor was then rapidly pressurized to 345 bar with $CO_2$. The reaction was allowed to stir for 24 hours. The reactor was then cooled to room temperature and the polymer was collected into an erlenmeyer flask, washed with methanol and dried in vacuo overnight (yield 75%).

EXAMPLE 10

Solvatochromic Studies of Phenol Blue in $CO_2$ With and Without FOMA-2-Ethylhexyl Aorylate-FoMA Triblock Copolymers Solvatochromatic studies were conducted on the copolymer surfactant prepared in Example 9 to investigate micelle formation in $CO_2$. A dilute solution of phenol blue in cyclohexane ($1.5 \times 10^5$ M) was prepared in advance. Ten drops of the solution were syringed into a 2.5 mL high pressure UV cell which was loaded with 0.125 g of the triblock copolymer (5 wt. %). The solvent was evaporated by purging with argon. The cell was filled with carbon dioxide to 3500 psi at room temperature and UV spectra were recorded after the system became homogeneous. For comparison, UV spectra of phenol blue in pure $CO_2$ and $CO_2$/poly(FOA) solution were also measured.

EXAMPLE 11

Figure 2:
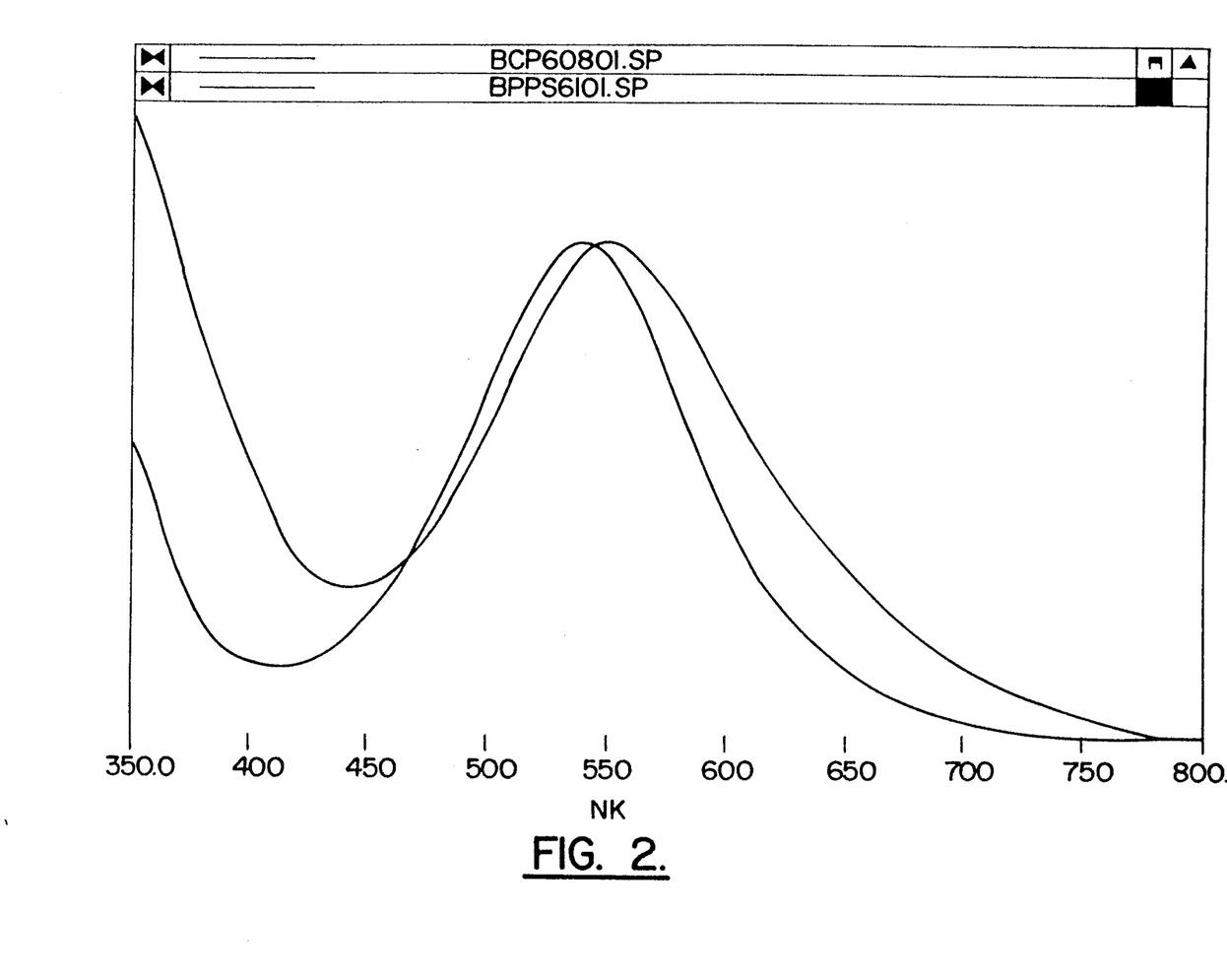
FIG. 2 is a plot showing the absorption spectrum for a FOMA-Ethyl hexylacrylate-FOMA copolymer in $CO_2$.

Results of Solvatochromatic Studies of Phenol Blue in $CO_2$ With and Without the FC-HC-FC Triblock Copolymers Since phenol blue itself is soluble in $CO_2$, in the micelle solution, the dye should partition between the bulk $CO_2$ phase and the core of the micelle. The measured $\lambda_{max}$ of phenol blue in pure $CO_2$ at 3500 psi and room temperature was 538 nm, which is consistent with the reported value. No shift of the $\lambda_{max}$ of phenol blue was observed in 5 wt. % Poly(FOA)/$CO_2$ solution at the same temperature and pressure However, in 5 wt. % triblock copolymer/$CO_2$ solution, the $\lambda_{max}$ of phenol blue shifted from 538 nm to 550 nm, and the peak was broadened (FIG. 2). This suggests the formation of micelles of the triblock copolymer in carbon dioxide, although the broadening of the peak rather than the appearance of an entirely new peak is likely due to the different shapes and sizes of the micelles formed, and probably also due to the dynamic feature of the micelles.

EXAMPLES 12-14 20

Heterogeneous Polymerization of Styrene with AIBN and without surfactant

Trials attempting to heterogeneously polymerize styrene in $CO_2$ were carried out. Parameters varied between polymerization trials were the pressure of the reactor (97 or 345 bar), the initiator (either AIBN (155 mg—0.2 wt % to monomer) or the fluoro-azo initiator prepared in Example 3 (2.4 g)), and the presence or absence of the FOMA-styrene-FOMA surfactant prepared in Example 9.

The polymerizations commenced by first heating a high pressure reactor to 60° C. (with AIBN as the initiator) or 75° C. (with the fluoro-azo initiator) and purging with argon for 1-2 hours. The initiator was dissolved in 77.5 g 17 wt %) of degassed styrene. The solution was rapidly added to the reactor followed by the addition of C02 to the desired pressure. The reaction was stirred for 8 hours at a rate of 500 rpm. Following cooling of the reactor, the polymer was collected, washed with methanol and dried in vacuo overnight.

The results of the polymerization trials are included in Table 4.

TABLE 4

| Sample ID | Pressure (bar) | Surfactant (w/v %) | Initiator | Yield (%) |
|---|---|---|---|---|
| 12 | 345 | none | AIBN | 7 |
| 13 | 97 | none | AIBN | 16 |
| 14 | 345 | 5 | AIBN | 22 |
| 15 | 345 | none | fluoro-azo | 16 |
| 16 | 97 | none | fluoro-azo | 9 |
| 17 | 345 | 5 | fluoro-azo | 20 |
| 18 | 97 | 1 | fluoro-azo | 35 |
| 19 | 97 | 5 | fluoro-azo | 45 |
| 20 | 97 | 10 | fluoro-azo | 60 |

As shown by the data of Table 4, the yield of the polymer increased substantially with the inclusion of the fluoro-azo initiator and a surfactant having a $CO_2$-philic portion.

EXAMPLE 21

Synthesis of $PS-Si(CH_3)_2CH_2CH_2C_6F_{13}$

Anionic polymerization was conducted in a one-neck 500 ml, round-bottomed flask equipped with a magnetic stir bar and rubber sepla under a 6-8 psig. argon atmosphere. The flask was charged with 2.25 mL of styrene in about 100 mL of dry cycolohexane. The polymerization was then initiated by the addition of 3.63 mL of a 1.38 M solution of sec-butyllithlum in cyclohexane. The resulting orange-red solution was then allowed to stir for about two hours after which about 2 mL of dry tetrahydrofuran was added to the solution. To functionally terminate the polymerization, 3.31 mL of perfluorohexylethyidimethylsllylchloride (20% excess) was added via syringe and allowed to stir for ca. 30 minutes. During this time, the solution had become cloudy due to the precipitation of lithium chloride. The polymer was precipitated in a ten-fold excess of methanol and washed several times with methanol and water. The polymer was then dried under reduced pressure at 40° C. for twelve hours.

The resulting polymer was soluble in $CO_2$ and 60° C. and 5000 psi. The precursor polystyrene backing the fluorinated group was less soluble in $CO_2$.

The foregoing examples are illustrative of the present invention, and are not to be construed as limiting thereof. The invention is defined by the following claims, with equivalents of the claims to be included therein.

That which is claimed is:

1. A method of carrying out the heterogenous polymerization of a water-insoluble polymer, the method comprising:

providing a heterogeneous reaction mixture comprising carbon dioxide, a monomer, and a surfactant that stabilizes said monomer in said carbon dioxide, wherein said surfactant comprises a carbon dioxide soluble segment;

polymerizing said monomer in said reaction mixture to form said water-insoluble polymer.

2. A method according to claim 1, wherein said reaction mixture further comprises an initiator.

3. A method according to claim 2, wherein said initiator is solubilized in said continuous phase so that said polymerization is an suspension polymerization.

4. A method according to claim 2, wherein said initiator is solubilized in said dispersed phase so that said polymerization is a suspension polymerization.

5. A method according to claim 1, wherein said monomer is selected from the group consisting of styrene monomers, acrylic monomers, vinyl chloride monomers, olefinic monomers, fluoroolefinic monomers, and maleic anhydride monomers.

6. A method according to claim 1, wherein said carbon dioxide-soluble segment is a fluorine-containing segment or a siloxane-containing segment.

7. A method according to claim 1, wherein said reaction mixture further comprises at least one hydrophilic monomer.

8. A method according to claim 1, wherein said surfactant further comprises a hydrophobic segment covalently linked to said carbon dioxide-soluble segment.

9. A method according to claim 1, further comprising separating said polymer from said solution following the polymerizing step.

10. A method according to claim 9, further comprising collecting said polymer from said solution following the separating step.

* * * * *

UNITED STATES PATENT AND TRADEMARK OFFICE
CERTIFICATE OF CORRECTION

PATENT NO. : 5,312,882

DATED : May 17, 1994

INVENTOR(S) : Joseph M. DeSimone, Elise E. Maury, James R. Combes & Yusuf Z. Menceloglu It is certified that error appears in the above-identified patent and that said Letters Patent is hereby corrected as shown below:

On the title page:

Abstract, please correct the words " water-soluble " to read -- water-insoluble -- in both places.

Column 2, line 49, please correct " aminoalcohoIs " to read -- aminoalcohols --.

Column 7, Formula XIII, please correct " $\text{-(CF}_2\text{)}_y$ " to read -- $\text{-(CF}_2\text{)}_7$ --.

Column 9, Formula XIII, please correct " $\text{-(CF}_2\text{)}_y$ " to read -- $\text{-(CF}_2\text{)}_7$ --.

Column 9, line 52, please correct " Polvmerization " to read -- Polymerization --.

Column 13, line 30, please correct " FoMA " to read -- FOMA --.

Page 1 of 2

UNITED STATES PATENT AND TRADEMARK OFFICE
CERTIFICATE OF CORRECTION

PATENT NO. : 5,312,882

DATED : May 17, 1994

INVENTOR(S) : Joseph M. DeSimone, Elise E. Maury, James R. Combes & Yusuf Z. Menceloglu It is certified that error appears in the above-indentified patent and that said Letters Patent is hereby corrected as shown below:

Column 14, line 1, please correct " 12-14 20 " to read -- 12-20 --.

Signed and Sealed this

Twenty-third Day of May, 1995

Attest:

BRUCE LEHMAN

Attesting Officer

Commissioner of Patents and Trademarks